United States Patent [19]

Hebert

[11] 4,316,433
[45] Feb. 23, 1982

[54] ANIMAL WASHING STAND

[76] Inventor: Kenneth B. Hebert, 1200 Dixon Rd., Little Rock, Ark. 72206

[21] Appl. No.: 113,469

[22] Filed: Jan. 21, 1980

[51] Int. Cl.³ .............................................. A01K 13/00
[52] U.S. Cl. .................................................... 119/158
[58] Field of Search ............... 119/1, 158; 4/637, 654, 4/656, 657, 661

[56] References Cited

U.S. PATENT DOCUMENTS

| | | | |
|---|---|---|---|
| 1,501,739 | 7/1924 | Benedek | 4/661 |
| 1,879,915 | 9/1932 | Smoot | 119/1 |
| 2,635,252 | 4/1953 | Gerue et al. | 4/657 |
| 2,661,865 | 12/1953 | Wendt | 119/158 X |
| 3,884,191 | 5/1975 | Stout | 119/158 |

*Primary Examiner*—Hugh R. Chamblee
*Attorney, Agent, or Firm*—Stephen D. Carver

[57] ABSTRACT

An animal bathing stand adapted to be disposed within wash basins or the like to aid in the washing of an animal. The stand preferably comprises a generally planar, rigid central surface elevated from the bottom of the wash basin by foot structure which may be varied in length to fit the individual application. A resilient pad disposed over the supporting surface provides secure footing for the animal to be washed. The pad preferably includes a peripheral skirt for adapting the stand for use in wash basins of varying dimensions. Perforations provided within the skirt aid in draining. Leash structure provided in a preferred form of the washing stand may be variably coupled between the supporting stand and the animal to facilitate use of the invention with animals of different height.

4 Claims, 7 Drawing Figures

ANIMAL WASHING STAND

BACKGROUND OF THE INVENTION

The present invention relates to apparatus for washing pets. More particularly, the present invention is directed to a support system adapted to be employed within a sink, wash tube or the like for supporting a pet to facilitate the washing and grooming thereof.

As will be well recognized by owners of pet dogs and other animal lovers, periodic attempts at washing or grooming canines within conventional bath tubs or sinks can be a frustrating and demanding operation. Once the animal is inserted into the sink or tub, panic may result, and the animal will quickly attempt to escape. When the animal attempts to escape, damage to the sink or basin in which he is being washed may occur as he attempts to claw his way out. This further aggravates the frustration of the dog owner who may already find himself in an uncomfortable position relative to the wash basin in which he is attempting to the hold the dog. Panic in canines is often caused when the animal's foot slips or skids across the porcelain or stainless steel surface of the sink or bathtub in which he is disposed. Contact with the drain also induces panic. Thus there exists a need to provide some form of animal support structure adaptable for use with conventional bath tubs, sinks or the like, in order to facilitate washing of animals without the aforementioned problems.

In the prior art a variety of inventions have been proposed for attachment to sinks. Usually these inventions are concerned with washing dishes or the like.

Examples of prior art of this type may be seen generally in U.S. Pat. Nos. 2,045,965; 4,033,461; 2,426,025; 958,857; 1,587,693; and 1,389,908. Examples of prior art devices used for washing animals are seen in U.S. Pat. Nos. 2,438,979 and 4,083,328.

SUMMARY OF THE INVENTION

The present invention comprises an animal washing stand which may be employed for washing pets in wash basins such as sinks, bath tubs or the like.

In its preferred form the invention comprises a generally rigid central planar surface which is adapted to be placed within the wash tub, being secured at an elevated position by foot structure which is preferably of variable height. The latter feature facilitates adjustment of the apparatus for use with different sized animals. A resilient, preferably rubber pad disposed on the supporting surface provides a secure foot rest for the animal. The pad includes a peripheral skirt adapted to contact the walls of the sink to facilitate drainage and to prevent the animal from contacting or seeing the lower areas of the wash basin. Preferably a leash structure is included to harness the animal to the wash stand.

Thus an object of this invention is to provide a stand for use in washing animals in conventional sinks, bath tubs, wash basins or the like.

Another object of this invention is to provide a means for harnessing a canine within a wash basin which will facilitate ease of grooming and washing of the animal.

A still further object of this invention is to provide a comfortable support for a dog to facilitate his grooming in bath tubs or wash basins.

A related object of this invention is therefore to provide a firm footing for an animal being washed within a bath tub or wash basin.

A still further object of this invention is to provide a wash tub of the character described adaptable for use with varying sizes of sinks or wash tubs and which will function with animals of different sizes. It is a feature of this invention that the peripheral skirt conforms the invention to the area or volume of the sink. Also, a variable height feature facilitates use with animals of different sizes.

Another object of this invention is to provide a washing stand for dogs, cats and other pets which facilitate ease of rinsing during the washing process and which will prevent the animal from standing in wash water, thereby increasing the animals' confidence.

Further, another object of this invention is to reduce the possibility of the animal's contacting an open drain hole during washing, thereby increasing the animals' confidence and reducing panic.

Another object of this invention is to greatly simplify the dog owner's task in periodically washing his animal.

These and other objects and advantages of this invention, along with features of novelty appurtenant thereto, will appear or become apparent in the course of the following description.

BRIEF DESCRIPTION OF THE DRAWINGS

In the appended drawings, which form a part of the specification and which are to be contrued in conjunction therewith, and in which like reference numerals have been employed throughout to indicate like parts in the various views.

DETAILED DESCRIPTION OF THE DRAWINGS

With reference now to the appended drawings, an animal bathing stand constructed in accordance with the teachings of this invention is designated generally by the reference numberal 10. The apparatus is adapted to be disposed within a sink, wash basin or the like to facilitate the regular bathing of a pet dog or other animal.

Figure 1:
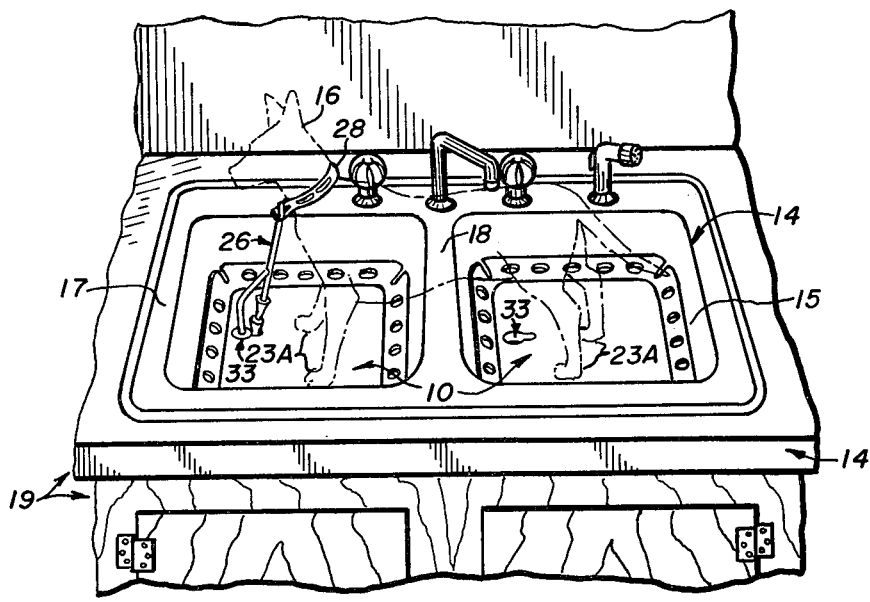
FIG. 1 is a perspective view illustrating the employment of a pair of bathing stands constructed in accordance with the teachings of this invention, with parts thereof broken away or shown in section for clarity.
Figure 1A:
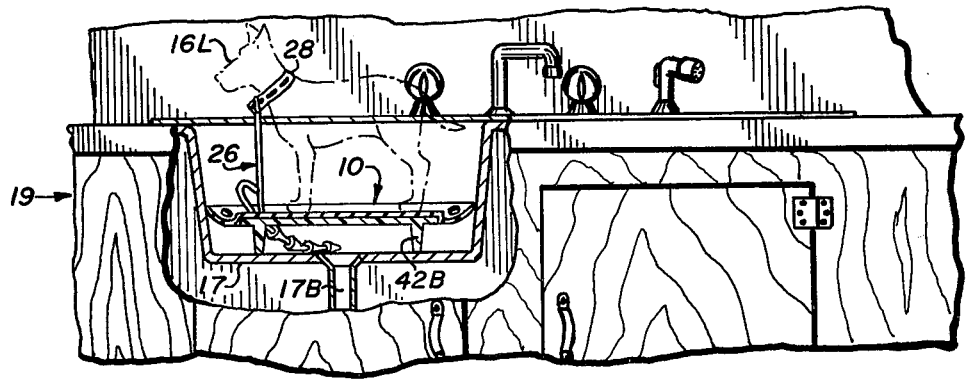
FIG. 1A is a perspective view similar to FIG. 1, with parts thereof broken away or shown in section for clarity, illustrating employment of the present invention in conjunction with a relatively small animal.
Figure 1B:
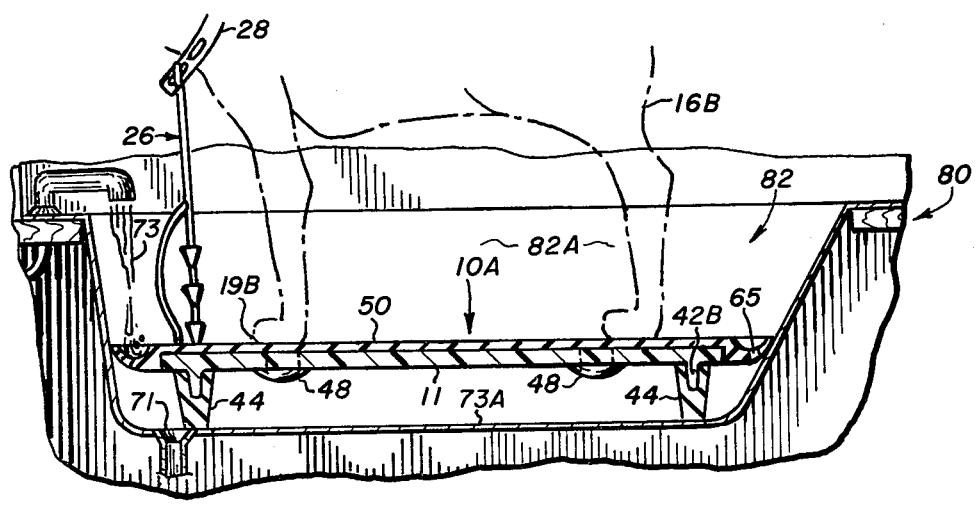
FIG. 1B is a perspective view of one embodiment of the present invention, with parts thereof broken away or shown in section for clarity, illustrating application of the invention for washing large animals within a bath tub.

With reference to FIG. 1, a pair of canine washing stands 10 are disposed in the opposite sink portions 15, 17 of the porcelain sink structure 14 disposed on top of vanity 19. Dog 16, illustrated generally in dotted lines, may be secured for washing within sink structure 14, supported on spaced-apart stands 10 in straddling relationship with respect to partition 18. It will be observed that feet 23 of the animal thus rest on the support stand rather than on the interior of the sink. Where a smaller animal 16L is to be washed (FIG. 1A) only one stand 10 may be necessary. However, with extremely large animals, such as a dog 16B (FIG. 1B), an enlarged stand 10A may be employed within a bath tub 82.

Figure 2:
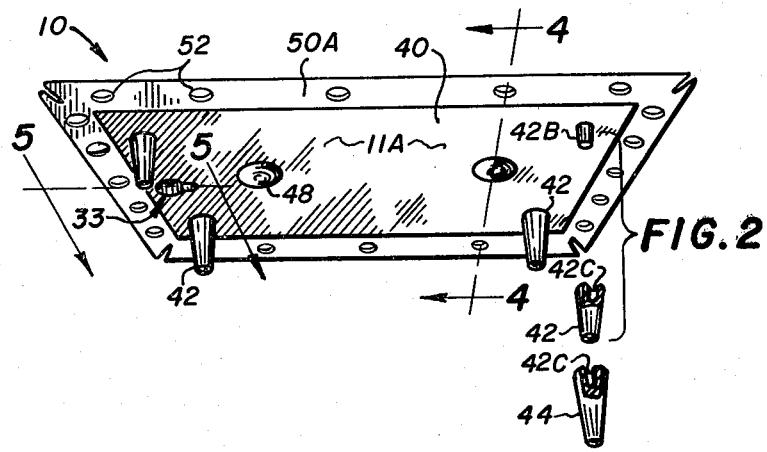
FIG. 2 is an exploded bottom perspective view showing the variable height feature of the present invention.

With reference now to FIG. 2, stand 10 preferably comprises a rigid, generally rectangular planar supporting surface 11 having an underside 11A. Supporting feet structure are included to elevate the wash stand at a preselected distance above the wash basin interior. The foot structure includes downwardly depending nubs 42B to which variably sized sleeves or standoffs 42 or 44 may be coupled. Nubs 42B fit tightly in orifices 42C defined axially within standoffs 42,44. Thus the stand owner may position the apparatus at a height most favorable for his application.

Figure 4:
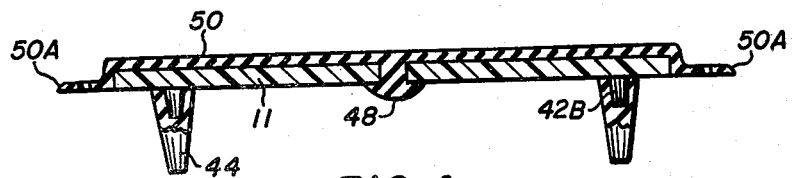
FIG. 4 is an enlarged, sectional view of a preferred embodiment of the invention taken generally along line 4—4 of FIG. 2; and, FIG. 5 is an enlarged, isometric view showing a preferred form of the leash structure, with parts thereof broken away or shown in section for clarity.

As best viewed in FIG. 4, the bathing stand includes a generally rectangular resilient pad 50 disposed on top of the central surface 11 and preferably comprised of rubber, plastic or the like. Pad 50, which will provide firm fitting for the animal to be washed, preferably includes an integral, resilient peripheral skirt 50A provided with a plurality of spaced-apart drain orifices 52. Skirt 50A will abut the edges of the sink or bath tub in which the apparatus is disposed to adapt the invention to the particular size or volume of the application. Moreover, drain orifices 52 will facilitate ease of draining during washing of the animal to prevent build-up of drain fluid. It will also be observed that the feet 42 will vertically elevate the unit to prevent the animal from standing in water.

With reference to FIG. 4, resilient pad 50 preferably includes integral button fasteners 48 at spaced-apart locations which are adapted to be snapped into mating engagement with receptive orifices defined in planar surface 11. In this manner the resilient pad 50 is secured to the structure to prevent motion or movement of same.

Figure 3:
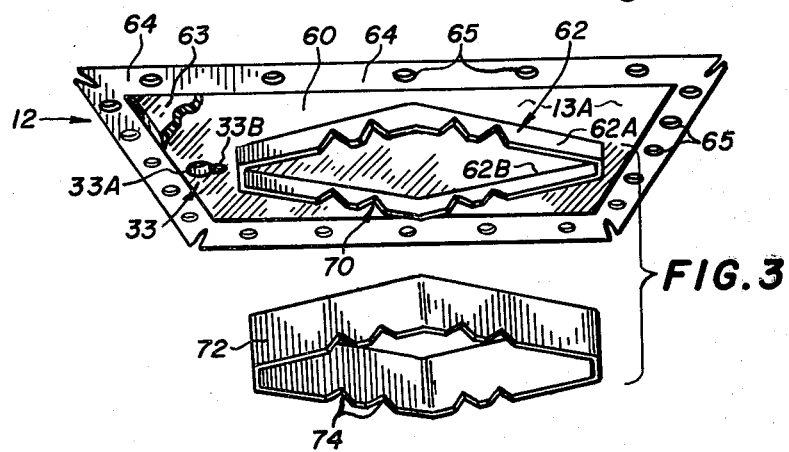
FIG. 3 is an exploded bottom perspective view showing an alternative design of the present invention.

With reference now to FIG. 3, an alternative embodiment of the present invention, generally designated by the reference numeral 12, is illustrated. Stand 12 includes a rigid, generally planar central supporting surface 13 including an underside 13A. Unit 12 is equipped with notched, elevating foot structure 62 forming a peripheral fence. Fence 62 includes a plurality of intersecting walls 62A–62D. It will be observed that spaced-apart notches 70 facilitate drainage where the fence 62 happens to surround the drain orifice within wash basin. A similarly shaped, notched, stand-off structure 72 is adapted to be coupled to fence 70 to raise the level of surface 13A a preselected amount within the wash basin or sink. In this fashion the apparatus may be employed with sinks or wash basins of varying height and with animals of different sizes. Fence 72 includes notches 74 to facilitate drainage.

A resilient pad 63 provides firm footing for the animal being washed. A peripheral skirt 64 is included to adapt unit 12 for for employment in varying sizes of sinks or wash tubs. Drain holes 65 are provided at spaced-apart locations within the skirt to facilitate drainage as discussed previously. It is contemplated that pad 63 may be secured to surface 13 via button coupling structure as illustrated in FIG. 4.

Figure 5:
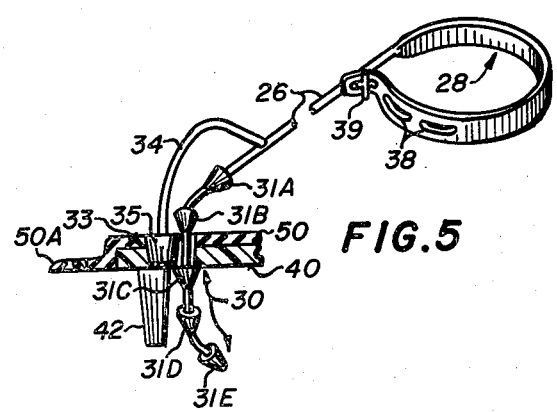

With particular reference now to FIG. 5, both embodiments 10, 12 of the present invention preferably include a leash structure 30 which is adapted to harness the animal being washed. The leash structure 30 includes an elongated, central portion 26 which terminates in a collar 28. It will be apparent that collar 28 includes a plurality of spaced-apart, elongated slots 38 which, when the collar is twisted appropriately, will engage a generally transverse locking projection 39 for securing the collar about the neck of the animal. The lowermost ends of the leash include a plurality of spaced-apart, preferably tapered retaining plugs 31A–31E which are adapted to be fitted through a slotted orifice 33 (FIG. 2) for selective attachment to the supporting surface. It will be apparent that in operation the plugs 31A–31E will gradually be drawn through orifice 33A until the animal is positioned at a desired height above pad 50. When the operator has selected an appropriate plug 31A–31E, he need merely slide the plug manually beneath retaining slot 33B so that removal of the leash will be prevented and the animal will thus be appropriately harnessed for washing. In order to further secure plugs 31A–31E, an additional locking plug 35, coupled to the leash 26 via filament 34, is provided. It will be apparent that plug 35 may be simply press fitted into orifice 33A to absolutely prohibit further withdrawal of the locking plugs 31A–31E until washing of the animal is accomplished. Of course, it will be recognized by those skilled in the art that varying designs of leash or collar systems may be employed in conjunction with the washing stand.

In operation one or two of the bathing stands may be employed. For example, FIG. 1 illustrates employment of a pair of support stands, each disposed in adjacent sinks, 17, 15 and separated by a partition 18. It will be apparent that dog 16, harnessed to the apparatus by leash 26, straddles partition 18, and his feet 23A are firmly supported by each of the two stands. A very small dog, such as dog 16L (FIG. 1A), may be completely supported within sink portion 17 completely on top of a single bathing stand 10 or 12. It will be observed that the animal's feet will be prevented from contacting drain hole 17B, and the edges of the sink by the present invention. Also, standing water will not contact the animal's feet as it flows toward drain 17B. Finally, where relatively large dogs 16B are to be bathed within bath tub structures 82, a relatively larger embodiment 10A may be provided. Again, it will be apparent that the peripheral skirt orifices 65 will facilitate draining, and drain water 73 entering the tub 82 will be prevented from contacting animal 16B. At all times the animal will be provided with secure footing. Thus, through the use of the present invention, the animal owner will be able to reduce animal stress and anxiety during washing.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:
1. An animal bathing stand adapted to be disposed within a wash basin or the like, said stand comprising:
 a rigid, generally planar central supporting surface;

foot means for elevating said central supporting surface a predetermined distance above a lowermost surface within said basin, said foot means comprising a plurality of nubs integrally attached to said supporting surface and standoffs selectively attachable to said nubs for varying the height at which said central surface may be positioned within said basin;

resilient non perforated pad means disposed on said supporting surface for providing firm footing for an animal to be washed, said pad means including a peripheral skirt for adapting said stand for use in differing sizes of basins, said skirt provided with a plurality of spaced-apart drain holes; and, means for coupling leash means to said stand whereby to restrain said animal to be washed.

2. The combination as defined in claim 1 wherein said stand comprises leash means for securing an animal to be washed, a collar end of said leash means adapted to be coupled about said animal and the terminal end adapted to be attached to said means for coupling said leash means to said stand.

3. The combination as defined in claim 2 wherein:

said leash means terminal end is provided with a plurality of spaced-apart retaining plugs; and, said central supporting surface is provided with an integral slotted orifice adapted to matingly receive preselected ones of said plugs whereby to secure said leash means to said stand.

4. The combination as defined in claim 3 wherein said pad means includes integral button fastener means and said supporting surface includes fastening orifice means adapted to receive said button means whereby to secure said pad to said supporting device.

* * * * *